Patented Feb. 9, 1937

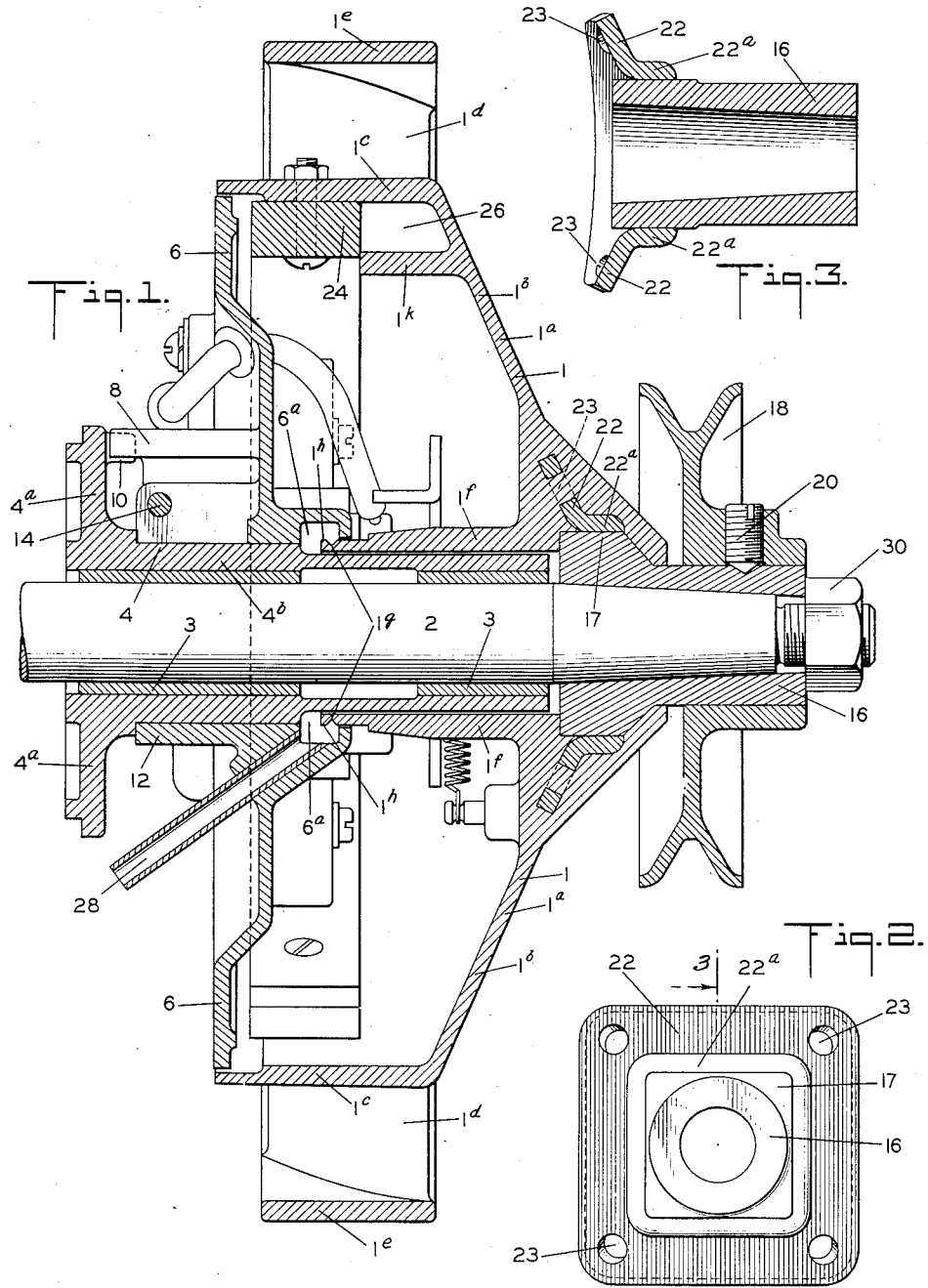

2,070,485

UNITED STATES PATENT OFFICE 2,070,485

FLYWHEEL GENERATOR

George F. Kuehn, Jackson Heights, and George A. Richroath, Brooklyn, N. Y., assignors to Eisemann Magneto Corporation, New York, N. Y., a corporation of New York Application January 31, 1935, Serial No. 4,414

11 Claims. (Cl. 171—252)

This invention relates to flywheel generators of the type having a revolving permanent magnet and it is an object of this invention to provide a generator of the type described of an improved construction which positively positions the magnet with respect to the key-way in the engine shaft so that the timing of the spark with respect to the engine piston position is maintained constant; that counterweighting of the moving parts is effected by a counterweight of much less weight, and that the throwing of oil by the flywheel or rotor portion of the generator is so guided or controlled that all oil thrown can be collected without the electrical portions of the apparatus being subjected thereto. It is also an object of this invention to provide a generator of the type described of an improved construction having a lesser number of parts which may be more readily and quickly assembled and at a lesser cost and in which the parts are so constructed that the generator may be dismantled and reassembled without danger of altering the electrical characteristics of the generator or the timing of the spark.

In the drawing:

Fig. 1 is a vertical section of a generator constructed in accordance with this invention, the generator being shown detached from the casing of the internal combustion engine to which it is normally secured;

Fig. 2 is a view in elevation of the means used in securing the cast flywheel or rotor portion of the generator on the engine shaft; and Fig. 3 is a vertical section taken on the line 3—3 of Fig. 2.

In the drawing the rotor 1 is shown mounted upon a shaft 2 which is journalled in bushings 3 carried in a bearing 4 having a flange or plate portion 4—a by which it is secured to the engine casing in the usual manner. Mounted upon the projecting hub portion 4—b of the bearing is a stator 6 upon which are mounted the usual coils and pole piece, the stator being positioned with respect to the hub by the usual projection 8 which engages between abutments 10 formed integral with the plate 4—a of the bearing 4. The stator is provided with a split collar 12 which is tightened by a bolt 14 as shown in Patent No. 1,141,336, Hamm, June 1, 1915, to secure the stator in position on the projecting portion 4—b of the bearing.

The rotor 1 comprises a steel hub 16 having a tapered bore which fits the tapered end of the shaft 2 and its outer surface cylindrical for a portion of its length to form a seat for the pulley 18 secured thereon by the set screw 20. At its inner end the steel hub 16 is rectangular in shape, as at 17, and has mounted thereon a rectangular plate 22 which is pressed to form a flange 22—a surrounding a rectangular opening which receives the rectangular portion of the hub 16 with the remainder of the plate at an angle to the axis of the shaft and provided with openings 23 adjacent the corners of the plate. Secured to the plate 22 and to the hub 16 and securing the plate 22 to the hub 16 by being cast thereabout is the body 1—a of the rotor 1. The body comprises a plate-like portion 1—b which has at its perimeter a circular flange 1—c which projects from the plate 1—b and lies parallel to the axis of the shaft 2. Projecting radially from the flange 1—c are the vanes 1—d which serve as fan blades to blow air to cool the motor and as spokes to attach the rim 1—e to the flange 1—c. The flange 1—c of the rotor body 1 is cut away for a short distance at its outer edge to form a recess in which the stator 6 is placed. While the plate 22 has been shown as a separately formed rectangular plate it may be formed as an integral portion of the hub 16 and of different or irregular shape so long as it projects from the hub and its shape is such that the body 1—a will interlock therewith and be secured thereto when cast about the plate and the hub.

Projecting in the same direction from the rotor 1 as the flange 1—c and closely surrounding the bearing 4 is a center or hub portion 1—f which is grooved or otherwise shaped as at 1—g adjacent the free end thereof so as to form a narrow ring or projecting portion 1—h at the end thereof which serves to throw oil from the rotor hub and prevents oil creeping along the hub portion 1—f to be thrown from the rotor where it will engage the electrical parts of the device. The hub of the stator 6 has a portion formed integrally therewith projecting towards the hub portion 1—f of the rotor and formed with an annular chamber 6—a opening towards the rotor to receive the ring portion 1—h of the rotor 1. The annular chamber 6—a serves as an oil collecting chamber for such oil as creeps from the shaft 2 along the inner faces of the steel hub 16 and the hub portion 1—h of the rotor body. Such oil is thrown off the ring 1—h within the chamber 6—a as the groove 1—g prevents oil travelling along the outer face of the rotor hub portion 1—f. Oil collected in the chamber 6—a is drained therefrom through the drain or drip which comprises a short pipe or tube 28 pressed into an opening drilled into the stator and communicating with the chamber 6—a, the tube 28 being frictionally or otherwise held in the opening.

Formed integral with the disc portion 1—b and the flange 1—c is an angular wall portion 1—k which, with the disk 1—b and the flange 1—c, forms a chamber or recess 26, the thickness of the wall portion 1—k being proportioned so as to provide sufficient weight to counterweight the moving parts of the motor, but where this would lead to too great a wall thickness, or where it is desired to increase the counter-weighting effect, weights of any suitable character may be placed in the recess 26, such weights being held in position therein by the magnet 24 which closes the mouth of the recess.

The hub 16 is keyed to the shaft 2 in the usual manner and held in place thereon by a nut 30 which engages the threaded end of the shaft. The hub 16, being positively attached to the plate 23 and the body of the rotor 1, is definitely positioned with respect thereto so that the magnet 24 attached to the flange 1—c of the rotor 1 is definitely positioned with respect to the key-way of the hub 16 and, through the keying of the hub 16 with the shaft 2, is definitely positioned with respect to the piston of the engine and the spark generated by the magnet is positively timed with respect to the engine piston position.

What is claimed is:—

1. In a flywheel generator, a hub member adapted to be secured to a shaft and having an angular shoulder portion, a plate member fitting the shoulder portion of said hub and a rotor member interlocked with said plate member and engaging said hub member to secure said plate member in position.

2. In a flywheel generator, a hub member adapted to be secured to a shaft and having an angular portion, a plate member fitting the angular portion of said hub and a flywheel member interlocked with said plate member, said flywheel member having a counterweight receiving recess thereon and a magnet carried by said flywheel member and closing said recess.

3. In a flywheel generator, a shaft, a hub member secured thereon and having an angular portion, a plate member fitting the angular portion of said hub and a flywheel member interlocked with said plate, said hub supporting and driving said flywheel member and said flywheel member having a projecting tubular portion surrounding said shaft and grooved adjacent the free end thereof to prevent oil travel thereon.

4. In a flywheel generator, a shaft, a hub member secured thereon and having an angular portion, a plate member fitting the angular portion of said hub and a flywheel member interlocked with said plate, said hub supporting and driving said flywheel member and said flywheel member having a projecting tubular portion surrounding said shaft with its outer surface grooved adjacent the free end of said tubular portion to form an oil throwing member at the free end thereof.

5. In a flywheel generator, a shaft, a hub member secured thereon and having an angular portion, a plate member fitting the angular portion of said hub and a flywheel member interlocked with said plate, said hub supporting and driving said flywheel member and said flywheel member having a projecting tubular portion surrounding said shaft and shaped to form an oil throwing member at the free end thereof.

6. In a flywheel generator, a shaft, a hub member secured thereon and having an angular portion, a plate member fitting the angular portion of said hub and a flywheel member interlocked with said plate, said hub supporting and driving said flywheel member and said flywheel member having a projecting tubular portion surrounding said shaft and shaped to form an oil throwing member at the free end thereof and a stator member having an oil receiving chamber surrounding said oil throwing member.

7. In a flywheel generator, a hub member adapted to be secured on a shaft and having an angular portion, a plate member having a flanged opening fitting the angular portion of said hub and a flywheel member interlocked with said plate member and securing said plate member in position on said hub.

8. In a flywheel generator, a hub member adapted to be secured on a shaft and having an angular portion, a perforated plate member having a flanged opening fitting the angular portion of said hub and a flywheel member interlocking with the perforations in said plate member and engaging said hub at opposite sides of said plate member to secure said plate member in position on said hub.

9. In a flywheel generator, a hub member adapted to be secured on a shaft, a flywheel member secured on said hub member and a magnet carried by said flywheel member, said flywheel member having a counterweight receiving recess closed by said magnet.

10. In a flywheel generator, a hub member adapted to be secured on a shaft, a flywheel member secured on said hub member and having projecting wall portions constituting counter-balancing means and forming an open counterweight receiving recess and a magnet carried by said flywheel closing said recess.

11. In a flywheel generator, a flywheel comprising a plate member having a circular flange forming a seat for a magnet and a hub portion shaped adjacent an end thereof to prevent oil creeping on the outer face of said hub portion, said flange and hub portion being integral with said plate member and projecting in the same direction therefrom.

GEORGE F. KUEHN.
GEORGE A. RICHROATH.